US008626372B2

(12) United States Patent
Kumar et al.

(10) Patent No.: US 8,626,372 B2
(45) Date of Patent: Jan. 7, 2014

(54) SYSTEMS AND METHODS FOR DIAGNOSING AN ENGINE (75) Inventors: Ajith Kumar, Erie, PA (US); Somakumar Ramachandrapanicker, Bangalore (IN); Paul Flynn, Erie, PA (US); Arijit Banerjee, Kolkata (IN); Rupam Mukherjee, Bangalore (IN)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 13/234,460

(22) Filed: Sep. 16, 2011

(65) Prior Publication Data

US 2013/0068003 A1    Mar. 21, 2013

Related U.S. Application Data (60) Provisional application No. 61/535,049, filed on Sep. 15, 2011.

(51) Int. Cl.
*G06F 7/00* (2006.01)

(52) U.S. Cl.
USPC .......... 701/22; 701/29.1; 701/29.4; 701/29.6; 701/30.5; 701/30.6; 123/406.24; 123/406.26; 123/406.27; 318/139; 318/430; 318/432; 318/400.12

(58) Field of Classification Search
USPC .............. 701/22, 29.1, 29.4, 29.5, 29.6, 30.2, 701/30.5, 30.6, 30.7, 34.3, 34.4, 32.9, 99, 701/101, 102, 114; 455/277.1, 422.1, 455/562.1; 370/328, 329, 465; 379/93.06, 379/93.09; 323/208; 340/854.3; 381/315; 414/706, 713; 123/406.24, 406.26, 123/406.27, 406.41, 406.42, 406.43, 435, 123/679, 687; 73/114.58, 114.62, 114.61, 73/114.77, 114.02, 114.04, 114.11, 73/114.15, 114.23, 114.59; 318/139, 254, 318/430, 432, 400.12
See application file for complete search history.

(56) References Cited

U.S. PATENT DOCUMENTS

| | | | |
|---|---|---|---|
| 4,334,427 A | 6/1982 | Armstrong | |
| 5,216,915 A | 6/1993 | Sakamoto | |
| 5,711,272 A | 1/1998 | Maegawa et al. | |
| 5,728,941 A | 3/1998 | Yamamoto et al. | |
| 5,860,800 A | 1/1999 | Kramer et al. | |
| 6,021,758 A | 2/2000 | Carey et al. | |

(Continued)

FOREIGN PATENT DOCUMENTS

| | | |
|---|---|---|
| DE | 10001487 A1 | 8/2001 |
| DE | 102008050287 A1 | 4/2009 |

(Continued)

OTHER PUBLICATIONS

Search Report and Written Opinion from corresponding PCT Application No. PCT/US2012/053495 dated Mar. 5, 2013.

(Continued)

*Primary Examiner* — McDieunel Marc
(74) *Attorney, Agent, or Firm* — GE Global Patent Operation; John A. Kramer (57) ABSTRACT

A condition of an engine is diagnosed based on information provided by signals from speed sensors associated with the engine or other signals associated with a generator operationally connected to the engine. Different types of degradation are distinguished based on discerning characteristics within the information. Thus, a degraded engine component can be identified in a manner that reduces service induced delay.

27 Claims, 9 Drawing Sheets

(56) References Cited

U.S. PATENT DOCUMENTS

| | | | |
|---|---|---|---|
| 6,023,651 A | 2/2000 | Nakayama et al. | |
| 6,427,656 B1* | 8/2002 | Drecq et al. | 123/192.1 |
| 6,510,731 B2 | 1/2003 | Schricker et al. | |
| 6,658,346 B2 | 12/2003 | Maegawa | |
| 6,968,268 B2 | 11/2005 | Yamada et al. | |
| 7,133,766 B2 | 11/2006 | Kokubo | |
| 7,197,916 B2 | 4/2007 | Matsumoto et al. | |
| 7,669,559 B2* | 3/2010 | Aoyama et al. | 123/48 B |
| 7,761,223 B2 | 7/2010 | Wang et al. | |
| 2002/0050271 A1 | 5/2002 | Hasegawa et al. | |
| 2003/0089338 A1 | 5/2003 | Remele et al. | |
| 2004/0148926 A1 | 8/2004 | Morinaga et al. | |
| 2004/0199348 A1* | 10/2004 | Hitchcock et al. | 702/92 |
| 2005/0204805 A1 | 9/2005 | Wakahara et al. | |
| 2005/0229904 A1 | 10/2005 | Hagel et al. | |
| 2007/0250288 A1 | 10/2007 | Maier-Landgrebe | |
| 2008/0296896 A1* | 12/2008 | Spenceley et al. | 290/2 |
| 2009/0120174 A1 | 5/2009 | Nadera et al. | |
| 2009/0139781 A1* | 6/2009 | Straubel | 180/65.1 |
| 2009/0229355 A1 | 9/2009 | Shoda | |
| 2010/0162797 A1 | 7/2010 | Summers et al. | |
| 2010/0211296 A1 | 8/2010 | Saunders | |
| 2011/0153128 A1* | 6/2011 | Wright et al. | 701/22 |
| 2012/0059544 A1* | 3/2012 | Kinoshita et al. | 701/22 |
| 2012/0123709 A1* | 5/2012 | Chen et al. | 702/60 |
| 2012/0239348 A1* | 9/2012 | Banerjee et al. | 702/183 |
| 2012/0303259 A1* | 11/2012 | Prosser | 701/400 |
| 2012/0303397 A1* | 11/2012 | Prosser | 705/7.12 |
| 2013/0020993 A1* | 1/2013 | Taddeo et al. | 320/109 |
| 2013/0073126 A1* | 3/2013 | Kumar et al. | 701/22 |
| 2013/0073127 A1* | 3/2013 | Kumar et al. | 701/22 |
| 2013/0073175 A1* | 3/2013 | Banerjee et al. | 701/102 |

FOREIGN PATENT DOCUMENTS

| | | |
|---|---|---|
| DE | 102008032174 A1 | 7/2009 |
| DE | 102009051624 A1 | 2/2011 |
| EP | 0522849 A1 | 7/1991 |
| WO | 9419670 A1 | 9/1994 |

OTHER PUBLICATIONS

U.S. Appl. No. 13/047,200, filed Mar. 14, 2011.

* cited by examiner

SYSTEMS AND METHODS FOR DIAGNOSING AN ENGINE

This application claims the benefit of U.S. provisional patent application Ser. No. 61/535,049, filed on Sep. 15, 2011, which is hereby incorporated by reference in its entirety.

FIELD

Embodiments of the subject matter disclosed herein relate to systems and methods for diagnosing an engine.

BACKGROUND

Engine components may degrade during operation in various ways. For example, an engine cylinder in an engine may start mis-firing due to a worn out ignition plug. One approach to detect engine degradation is to monitor engine speed. Diagnostic routines can monitor whether components of the engine speed rise above a threshold level and generate diagnostic codes or other indications requesting service, de-rating engine power, or shutting down the engine. However, the inventors herein have recognized that traditional analysis of engine speed is often inadequate to thoroughly diagnose an engine problem.

BRIEF DESCRIPTION

In one embodiment, a method for a reciprocating engine is disclosed. The method includes diagnosing a condition of the engine based on harmonic content of a measured rotational speed of the reciprocating engine.

In one embodiment, a method for a reciprocating engine is disclosed. The method includes diagnosing a condition of the engine based on a difference in a measured rotational speed of the reciprocating engine from cycle to cycle.

In one embodiment, a method for a reciprocating engine is disclosed. The method includes diagnosing a condition of the engine based on differences in times for the reciprocating engine to rotate over a determined angle.

In one embodiment, a method for a reciprocating engine operationally connected to a generator is disclosed. The method includes measuring a rotational speed of the reciprocating engine over time, measuring electrical parameters associated with the generator over time, correlating characteristics of the measured rotational speed to characteristics of the measured electrical parameters, and diagnosing a condition of the engine based on the correlated characteristics.

In one embodiment, a method for a reciprocating engine is disclosed. The method includes measuring a rotational speed of the reciprocating engine over time, determining a torque profile by combining acceleration components derived from the measured rotational speed at determined characteristic frequencies, and diagnosing a condition of the engine based on characteristics of the torque profile.

In one embodiment, a vehicle system is disclosed. The vehicle system includes a reciprocating engine, a sensor for measuring a rotational speed of the reciprocating engine over time, and a controller including instructions configured to sample the measured speed and diagnose a condition of the engine based on at least one of harmonic content of the measured speed, a difference in the measured speed from cycle to cycle, and differences in times for the engine to rotate over a determined angle.

In one embodiment, a vehicle system is disclosed. The vehicle system includes an engine, a generator operatively connected to the engine, a sensor for measuring a rotational speed of the engine over time, sensors for measuring electrical parameters associated with the generator during operation, and a controller including instructions configured to sample the measured speed and the measured electrical parameters and diagnose a condition of the engine based on correlations between characteristics of the measured speed and characteristics of electrical parameters of the generator.

In one embodiment, a test kit is disclosed. The test kit includes a controller that is operable to determine a condition of a reciprocating engine based on at least one characteristic of a measured rotational speed of the reciprocating engine over time.

In one embodiment, a method for a reciprocating engine is disclosed. The method includes measuring a plurality of time intervals, wherein each time interval corresponds to an amount of time it takes for an engine to rotate over a specified angle. The method further includes determining a frequency content of the plurality of time intervals, calculating a combined value of the amplitudes of the frequency content around a specified harmonic frequency, and diagnosing a condition of the engine based on the combined value.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to systems and a methods for diagnosing an engine. Test kits for performing the methods are provided, also. The engine may be included in a vehicle, such as a locomotive system. Other suitable types of vehicles may include on-highway vehicles, off-highway vehicles, mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. These vehicles may include an engine with components that degrade with use.

Furthermore, embodiments of the subject matter disclosed herein may use generator data, such as measured generator electrical parameters or generator data (e.g., a derived torque profile) derived from measured generator electrical parameters and/or engine parameters (e.g., speed), to diagnose conditions of an engine and to distinguish between conditions and associated engine components.

An engine may be put in a particular operating condition or mode when looking for particular types of engine degradation. For example, the engine may be diagnosed during a self-loaded condition as part of a test procedure, a dynamic brake (db) setup condition, or a steady state motoring condition. The diagnostic and prognostic methods discussed herein can be used for trending, comparing cylinder-to-cylinder variation, performing test procedures, repair confirmation, and aid in repair. Alternatively, generator and/or engine data may be sampled and analyzed when the engine reaches a particular operating condition or state during normal operation.

Figure 1:
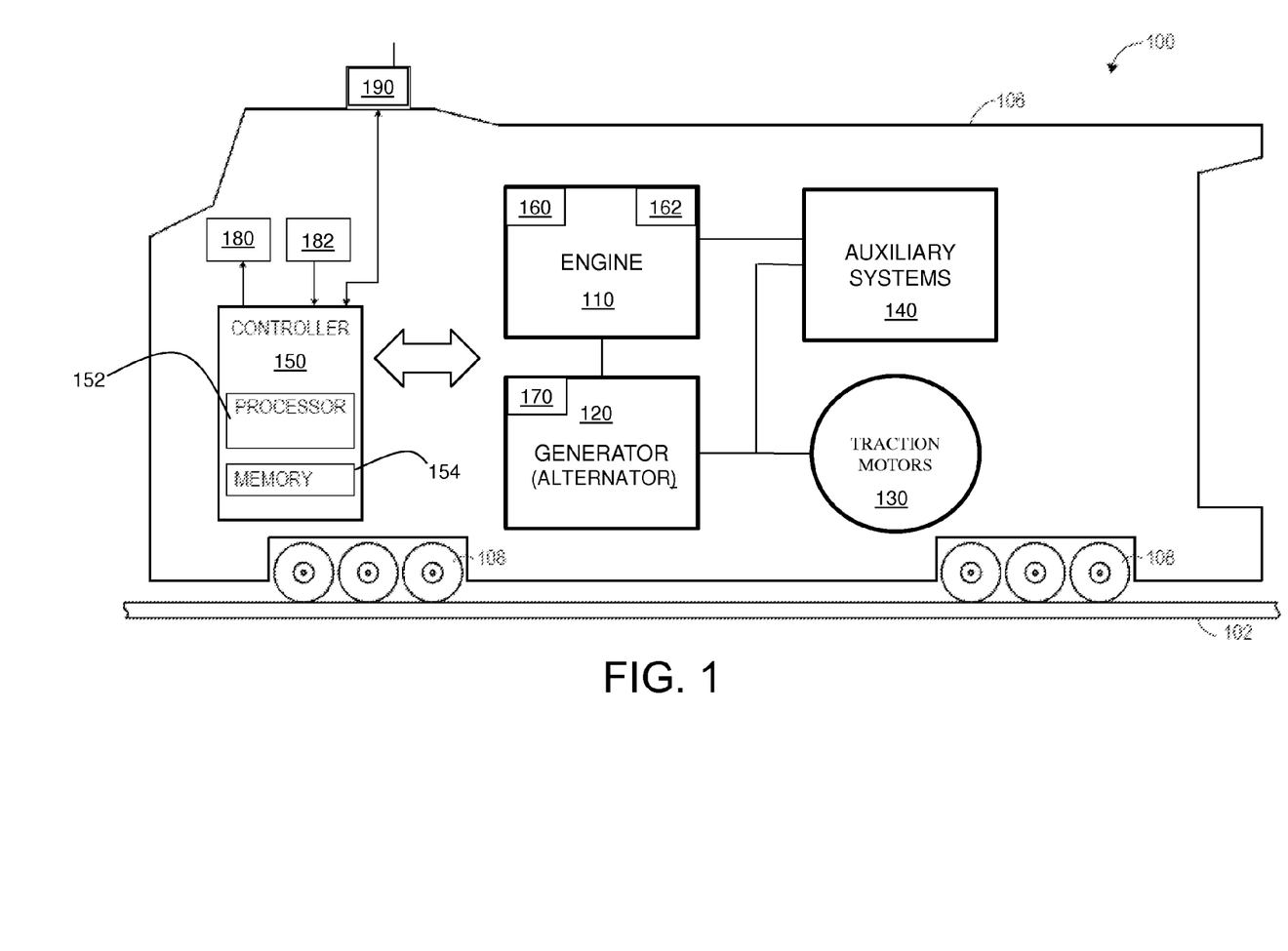
FIG. 1 is an illustration of an example embodiment of a vehicle system (e.g., a locomotive system), having an engine and a generator (alternator), herein depicted as a rail vehicle configured to run on a rail via a plurality of wheels.

FIG. 1 is an illustration of an example embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive a signal from a speed sensor 160 of the engine or from various generator sensors 170 to determine operating parameters and operating conditions, and correspondingly adjust various engine actuators 162 to control operation of the rail vehicle 106. In accordance with an embodiment, the speed sensor includes a multi-tooth pick-up wheel connected to the engine shaft 111, and a reluctance sensor for sensing when a tooth of the pick-up wheel passes by the reluctance sensor. For example, the controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine and/or auxiliary equipment performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine and a second diagnostic code may indicate a problem with cylinder 2 of the engine, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of vehicle system using signals from a GPS receiver. As another example, the controller may transmit operational characteristics of the engine to the control center via a message transmitted from communications system 190. In one embodiment, a message may be transmitted to the command center by communications system 190 when a degraded component of the engine is detected and the vehicle system may be scheduled for maintenance.

Figure 2:
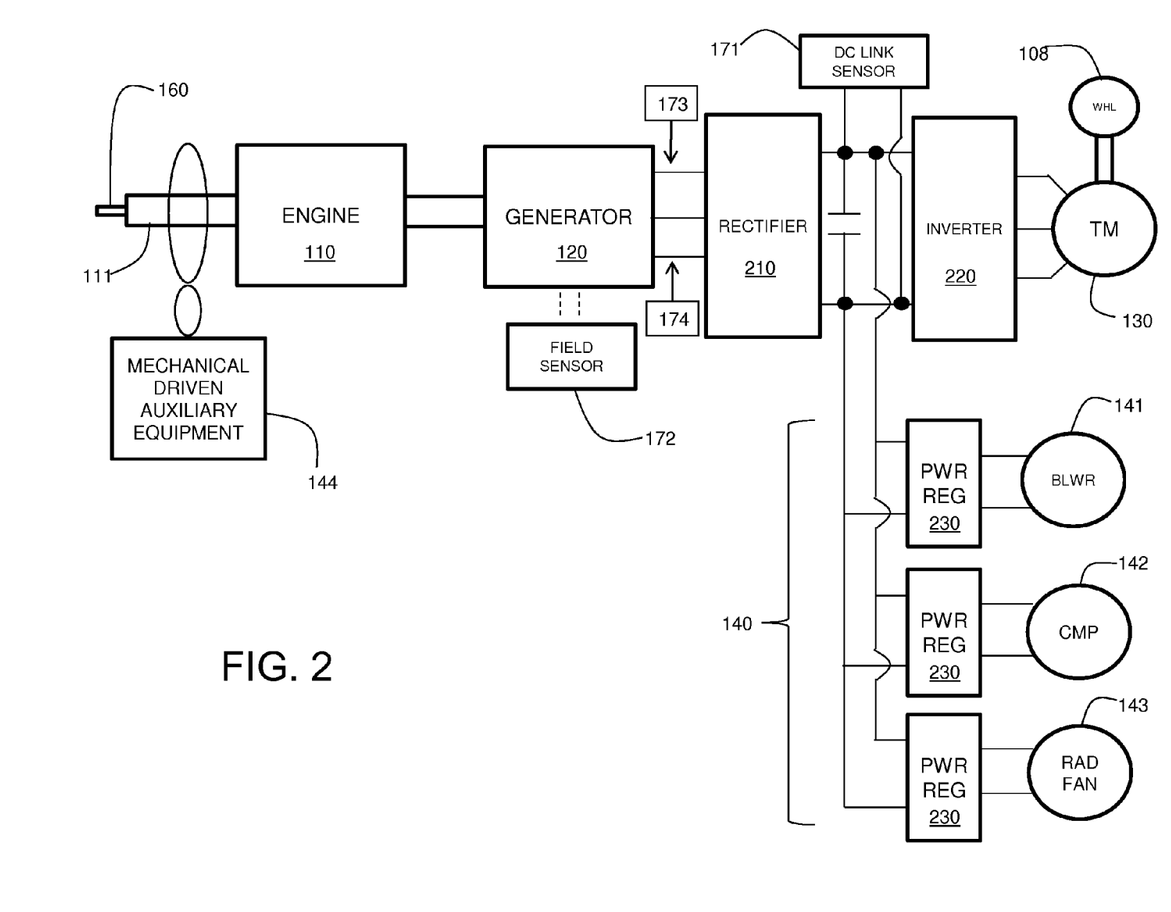
FIG. 2 is an illustration of an example embodiment of the engine and generator of FIG. 1 operatively connected to various auxiliary equipment and traction motors.

FIG. 2 is an illustration of an example embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143. The traction motors 130 are driven by the generator 120 through the rectifier 210 that produces a dc-link voltage to an inverter 220. Such auxiliary equipment 140, traction motors 130, and their implementations are well known in the art. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, and engine cooling systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively. Suitable commercially available sensors may be selected based on application specific parameters.

An engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of any cylinder is twice the frequency of revolution of the engine. The frequency of revolution of the engine may be described as the first engine order. Such a first order frequency component can show up in the frequency content of a measured generator parameter or engine speed signal. The firing frequency of a given cylinder of a four stroke engine may be described as the half engine order, where the half engine order is one half the frequency of revolution of the engine. Such a half order frequency component can also show up in the frequency content of a measured generator parameter or engine speed signal.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of any cylinder is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of measured generator parameters or an engine speed signal.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

For an engine that is "healthy" and is operating properly, the frequency content of the measured parameters can have a particular healthy signature. Deviations from such a healthy signature can indicate a problem with the engine. For example, in accordance with an embodiment, a condition of an engine may be diagnosed by analyzing a half order magnitude and/or phase of the frequency content.

In general, in accordance with various embodiments, a condition of an engine can be diagnosed based on a combination of measured parameters from the engine (e.g., speed or pressure) and the generator (e.g., dc-link voltage, etc.). Frequency content of the various parameters can be determined and compared to diagnose a particular engine condition. Furthermore, other parameter profiles (e.g., torque) can be estimated from the measured parameter profiles and, subsequently, the frequency content of those profiles can be analyzed to diagnose a particular engine condition.

Figure 3:
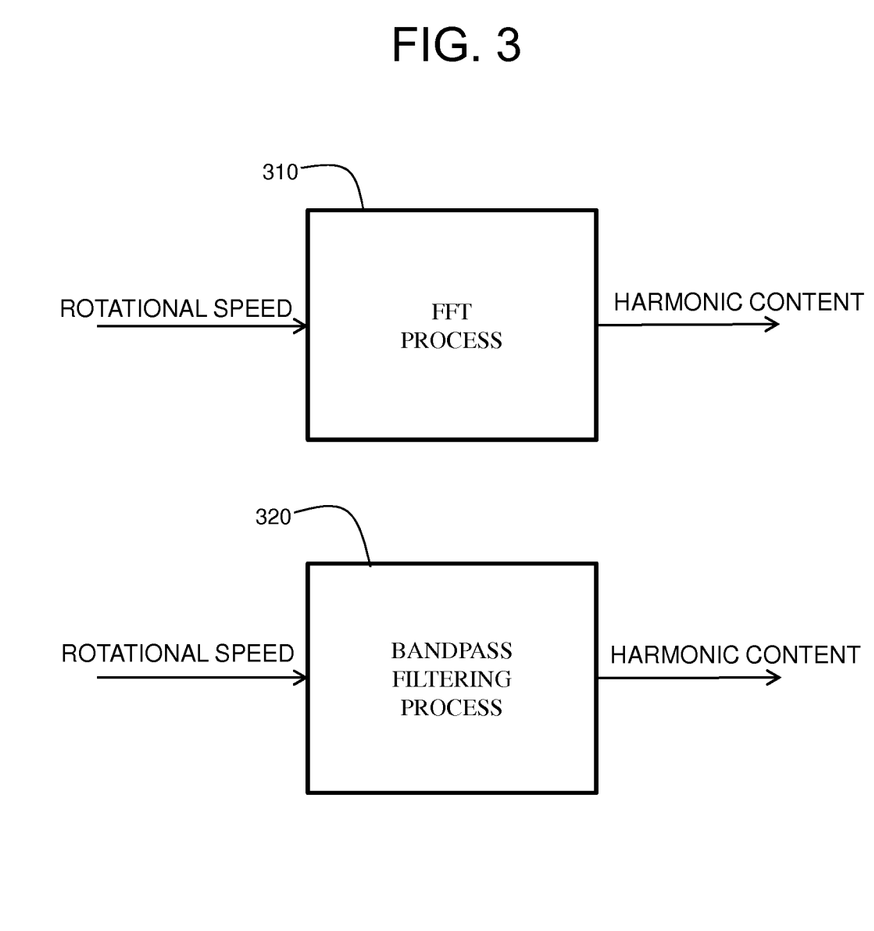
FIG. 3 is an illustration of example embodiments of how to generate frequency content from time domain rotational speed of the engine.

In one embodiment, the frequency content of the rotational speed of the engine (e.g., where speed is measured by the speed sensor 160) is used to diagnose a condition of an engine. FIG. 3 is an illustration of example embodiments of how to generate frequency content from time domain rotational speed of the engine. A Fourier transform process 310 (e.g., a Fast Fourier Transform, FFT, process) or a bandpass filtering process 320 can be used to extract the harmonic content. The frequency analysis process transforms the sampled time domain parameter into frequency content in the frequency domain. The various frequency components of the frequency content can include dc (zero order), fundamental (first order) and harmonic (second order, half order, third order, etc.) frequency components. In accordance with an embodiment, the Fourier Transform process and the bandpass filter process include computer executable instructions that are executed by the processor 152.

Figure 4:
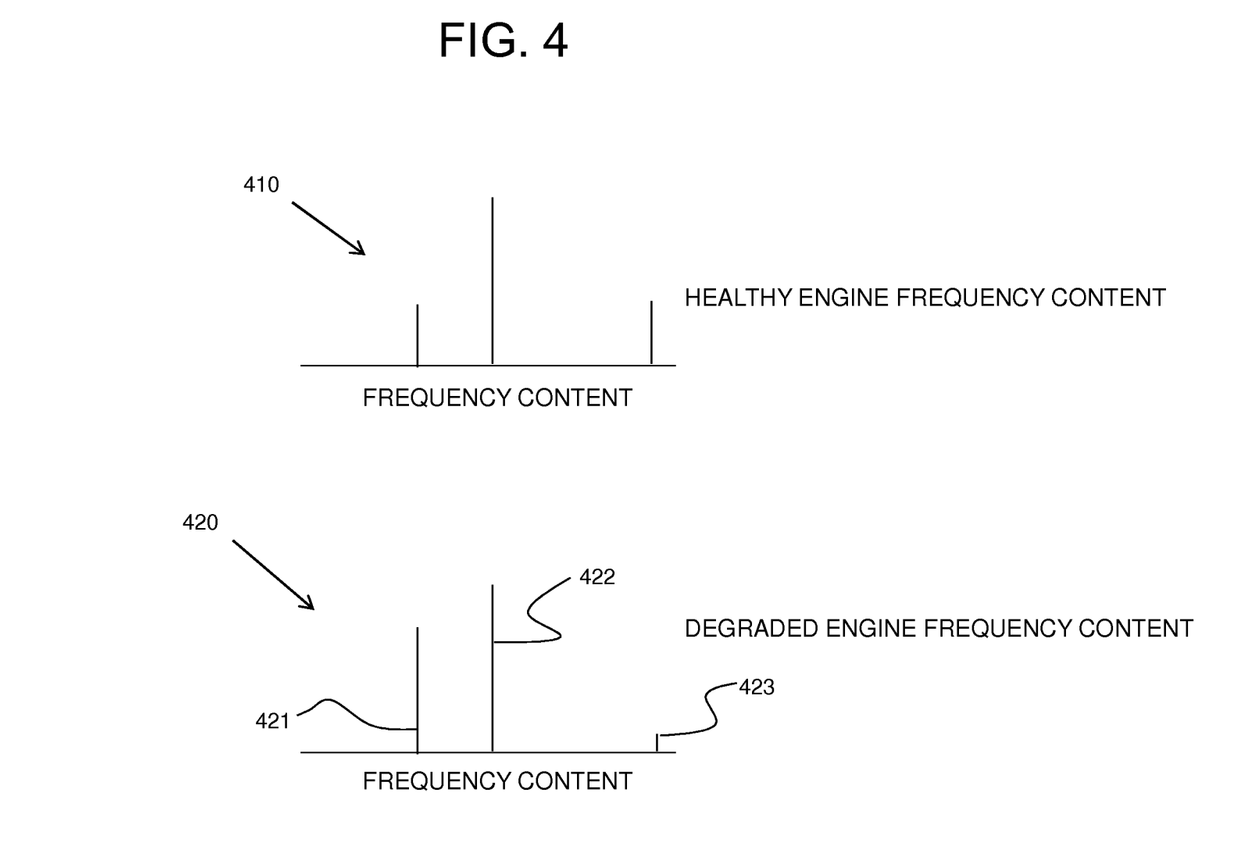
FIG. 4 is an illustration showing example embodiments of "healthy" and "unhealthy" frequency content.

FIG. 4 is an illustration showing example embodiments of "healthy" and "unhealthy" frequency content. The frequency content 410 of the healthy engine (i.e., an engine that is operating properly) has three frequency components of absolute and relative magnitudes as shown in FIG. 4, in accordance with an embodiment. The frequency content 420 of the unhealthy engine (i.e., an engine that is not operating properly due to some degradation or failure) has three frequency components at the same locations as in the frequency content 410 for the healthy engine. However, the amplitude of one frequency component 421 (e.g., a half order component) is distorted (e.g., increased in amplitude), and the amplitude of another frequency component 423 (e.g., a second order component) is also distorted (e.g., decreased in amplitude), in accordance with an embodiment. The distorted frequency components 421 and 423 in the frequency content 420 are indicative of an unhealthy engine. Furthermore, the particular characteristics of the distorted frequency components (e.g., amplitude) relative to the other frequency components in the frequency content 420 of the unhealthy engine can be indicative of a particular type of engine degradation or failure (e.g., cylinder number 3 of the engine is inoperable). Also, the phase of the half order component, with respect to a reference cylinder (e.g., cylinder number 1), can be used to isolate a problem to a particular cylinder.

The degraded components may cause the engine to operate less efficiently, with less power, and/or with more pollution, for example. Further, the condition of the degraded components may accelerate degradation of the components which may increase the likelihood of catastrophic engine failure and road failure. A degraded engine cylinder is an example of a degraded engine component. Thus, for a four-stroke engine, the distorted frequency component may occur at the half-order frequency. For a two-stroke engine, the distorted frequency component may occur at the first-order frequency. The diagnosis, then, may include both a warning of degradation as well as an indication of the type and/or location of the degraded engine component.

Figure 5:
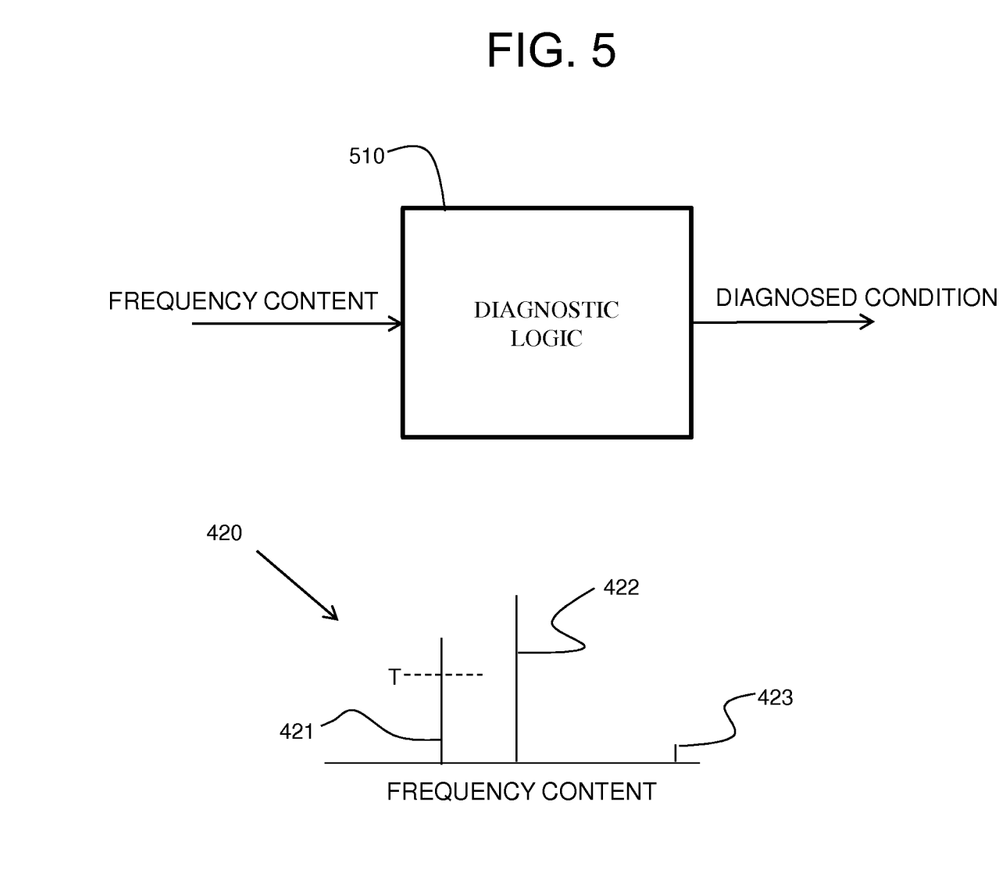
FIG. 5 is an illustration of an example embodiment of how a diagnostic logic in the controller can detect an unhealthy condition in the frequency content of an engine speed signal.

FIG. 5 is an illustration of an embodiment of how a diagnostic logic 510 in the controller 150 can detect an unhealthy condition in the frequency content of an engine speed signal. For example, the half order component 421 can be compared to a threshold level T by the diagnostic logic 510. If the magnitude of the component 421 exceeds the threshold level T, then the diagnostic logic 510 determines that degradation in the engine has occurred. Furthermore, if the diagnostic logic 510 determines that the ratio of the half order component to the first order component 422 exceeds a second threshold level, and the ratio of the first order component to the second order component 423 exceeds a third threshold level, then the diagnostic logic 510 isolates the degradation to a particular engine component (e.g., cylinder number 3). In accordance with an embodiment, the diagnostic logic includes computer executable instructions that are executed by the processor 152. In accordance with an embodiment, the ratio of a half order component to a dc or zero order component can be indicative of an engine problem. Furthermore, the threshold level T can be dependent on an operating condition of the engine such as, for example, power, speed, ambient conditions, repair history, etc.

Types of engine degradation or failures that can be diagnosed, distinguished, and isolated may include a worn out ignition plug, a fuel imbalance, a faulty cylinder, a knocking in the engine, a low fuel input, a low compression, and a valve train failure, for example. Once a degradation or failure is diagnosed, an action can be taken. Such actions may include, for example, providing a warning signal to the operator (e.g., via the display 180), adjusting an engine operating parameter (e.g., derating the engine power, shutting down at least one cylinder of the engine, shutting down the engine entirely, balancing cylinders of the engine), logging a maintenance action, and transmitting the diagnosed condition to a central location (e.g., via the communications system 190).

Therefore, the harmonic content (magnitudes and/or phases) of the rotational speed of the engine can be analyzed (e.g., using the diagnostic logic 510 of the controller) to determine degradation in the engine. In accordance with an embodiment, the reciprocating engine is first driven to a specified operating condition, state, or mode before sampling and processing the engine speed information. In accordance with another embodiment, the engine speed information is not sampled and processed until the engine reaches a determined operating condition, state, or mode during normal operation, where the controller is triggered to extract and analyze the harmonic content of the speed of the engine when the determined condition, state, or mode is reached.

In one embodiment, a difference in the measured rotational speed of the reciprocating engine from cycle to cycle (e.g., where speed is measured by the speed sensor 160) is used to diagnose a condition of an engine. A cycle can correspond to one full rotation or revolution of the engine. However, in accordance with various embodiments, a cycle can be defined otherwise as well. For example, a cycle can be two full revolutions of the engine (which may correspond to one cycle of a firing cylinder), or a cycle may be a half a revolution of the engine (which may correspond to the frequency of firing of any cylinder of the engine).

As the speed varies from cycle to cycle, characteristics (e.g., harmonic content) of the differences from cycle to cycle can be analyzed and correlated to a degraded condition of the engine. Again, in accordance with an embodiment, the reciprocating engine can first be driven to a specified operating condition, state, or mode before sampling and processing the engine speed information. In accordance with another embodiment, the engine speed information is not sampled and processed until the engine reaches a determined operating condition, state, or mode during normal operation, where the controller is triggered to determine and analyze the speed difference of the engine from cycle to cycle when the determined condition, state, or mode is reached.

Figure 6:
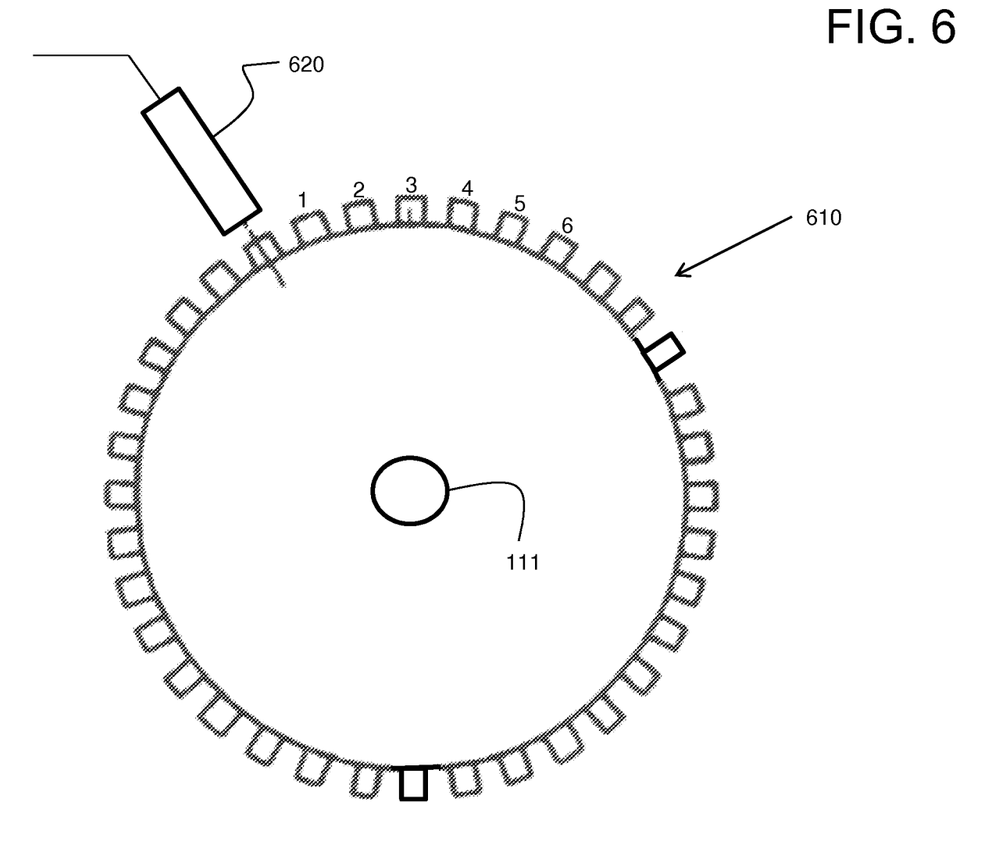
FIG. 6 is an illustration of an example embodiment of how a difference in time (a time interval) can be determined as an engine rotates.

In one embodiment, a difference in time for a reciprocating engine to rotate over a determined angle is used to diagnose a condition of an engine. The determined angle may be a full 360 degree rotation of the engine (cycle to cycle) or some lesser angle, for example. FIG. 6 is an illustration of an example embodiment of how such a difference in time (a time interval) can be determined. A toothed wheel 610 is connected to the rotating shaft 111 of the engine and rotates with the shaft 111. A sensor 620 (e.g., a reluctance sensor) is positioned adjacent to the toothed wheel 1010 and is capable of sensing when a tooth of the wheel 610 passes by the sensor 620 as the wheel 610 rotates. A time domain signal from the sensor 620 is fed to the controller 150. The controller is operable to sample the signal and determine the time difference between sensed teeth. The angular difference between adjacent teeth on the wheel corresponds to a determined angle. Therefore, the angular difference between any two teeth on the wheel corresponds to some determined angle. In accordance with an embodiment, the controller is configured to determine the time it takes for every two adjacent teeth to pass by the sensor.

Figure 7:
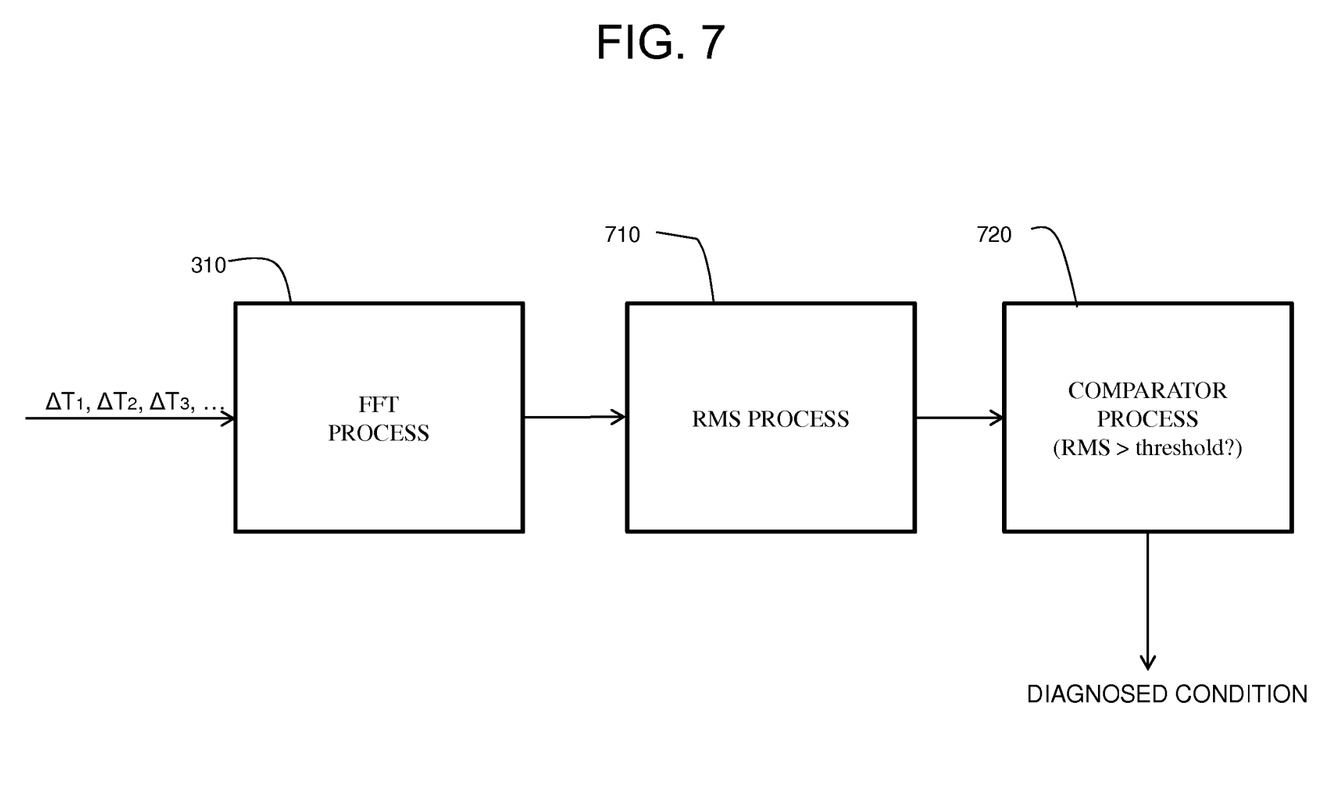
FIG. 7 is an illustration of an example embodiment of how to process the time intervals determined using the configuration of FIG. 6 to diagnose an engine condition.

For example, as the wheel 610 rotates, the time difference (time interval) $\Delta T_1$ between tooth 1 and tooth 2 is determined, the time difference $\Delta T_2$ between tooth 3 and tooth 4 is determined, the time difference $\Delta T_3$ between tooth 5 and tooth 6 is determined, and so on as the wheel rotates and the sensor 620 senses the individual teeth passing by. FIG. 7 is an illustration of an example embodiment of how to process the time intervals, determined using the configuration of FIG. 6, to diagnose an engine condition.

Referring to FIG. 7, the time domain samples of time intervals ($\Delta T_1$, $\Delta T_2$, $\Delta T_3$, . . . ) are processed (e.g., through a FFT process 310 of the controller) to determine the frequency content. A combined value (e.g., a root-mean-square, RMS, value or an average value) of the amplitudes of the frequency content around a specified harmonic frequency (e.g., around a half order frequency) is calculated by an RMS process 710 of the controller 150. Frequency content can exist at and around a particular harmonic frequency (e.g., around the half order frequency) due to load and speed variations, for example. A condition of the engine is diagnosed by a comparator process 720 of the controller based on the combined value (e.g., by comparing the combined value to a threshold value). A plurality of threshold values can be provided, each corresponding to a different level of severity of the degraded engine condition. Depending on the level of severity, different actions may be taken (e.g., log a scheduled maintenance action, derate engine power, shut down the engine).

Again, in accordance with an embodiment, the reciprocating engine can first be driven to a specified operating condition, state, or mode before sampling and processing the time intervals. In accordance with another embodiment, the time interval information is not sampled and processed until the engine reaches a determined operating condition, state, or mode during normal operation, where the controller is triggered to determine and analyze the time interval information when the determined condition, state, or mode is reached.

Figure 8:
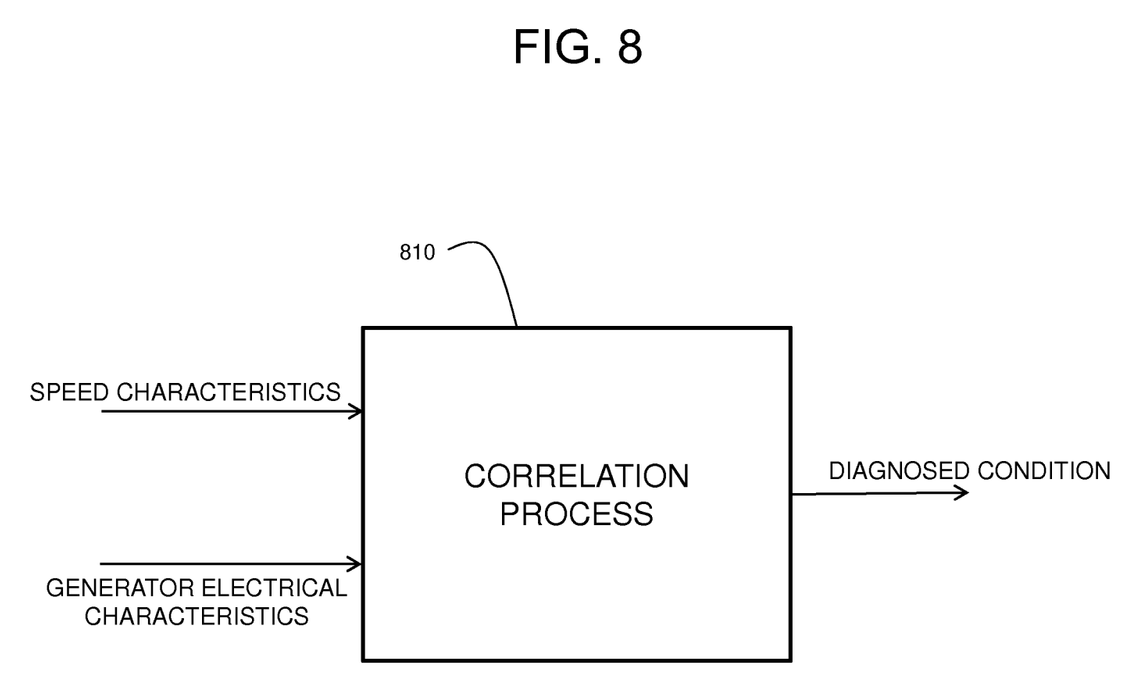
FIG. 8 is an illustration of an example embodiment of how to diagnose a condition of an engine by correlating engine speed characteristics and generator characteristics to each other.

FIG. 8 is an illustration of an example embodiment of how to diagnose a condition of an engine by correlating engine speed characteristics and generator characteristics to each other. The rotational speed of the engine 110 is measured over time (e.g., using the speed sensor 160) and electrical parameters associated with the generator 120 are measured over time. The controller 150 has a correlation process 810 which correlates characteristics of the measured rotational speed to characteristics of the measured electrical parameters. Based on the resultant correlations, a condition of the engine is diagnosed. Just as harmonic content of a time domain rotational speed signal from the engine may be determined using, for example, a FFT process or a bandpass filtering process, harmonic content of a time domain generator parameter may be similarly determined.

The characteristics of the rotational speed may include at least one of harmonic content of the rotational speed, a difference in the measured rotational speed from cycle to cycle, a torque profile derived from the rotational speed, and a difference in time for the reciprocating engine to rotate over a determined angle. The measured electrical parameters may include a dc-link voltage, a dc-link current, a generator field voltage, a generator field current, a generator output voltage, and a generator output current. Characteristics of the electrical parameters may include, for example, harmonic content of one or more of the parameters or a torque profile derived from one or more of the parameters. In accordance with an embodiment, the contribution of torque disturbances caused by a connected load (e.g., a sixth harmonic torque produced by a rectifier) can be removed or ignored as part of the process.

As an example, a half order component of the dc-link voltage may be correlated to a half order component of the speed signal for diagnostic purposes. If the amplitude of the half order component of the dc-link voltage is above a first threshold value, and the phase of the half order component of the speed signal is between a second threshold value and a third threshold value (with respect to some reference), then the engine is diagnosed as having a fueling problem with a particular cylinder.

As another example, a first order component of the generator field current may be correlated to a second order component of the speed signal. If the amplitude of the first order component of the field current is less than a first threshold, and the amplitude of the second order component of the speed signal is greater than a second threshold, then the engine is diagnosed as having a low compression problem. However, if the amplitude of the first order component of the field current is greater than the first threshold, and the amplitude of the second order component of the speed signal is still greater than the second threshold, then the engine is diagnosed as having a faulty ignition plug. Many other correlations and corresponding diagnoses are possible as well.

Again, in accordance with an embodiment, the reciprocating engine can first be driven to a specified operating condition, state, or mode before performing the correlation process 810. In accordance with another embodiment, the correlation process is not performed until the engine reaches a determined operating condition, state, or mode during normal operation, where the controller is triggered to perform the correlation process on the speed and generator characteristics.

In one embodiment, a test kit is provided having a controller that is operable to determine a condition of a reciprocating engine based on at least one characteristic of a measured rotational speed of the reciprocating engine over time. The test kit can further include one or more sensors to sense electrical parameters associated with a generator that is operatively connected to the engine during operation. The controller is operable to communicate with the one or more sensors to sample the electrical parameters over time. The controller is further operable to correlate characteristics of the measured rotational speed and characteristics of the electrical parameters to diagnose a condition of the engine.

Figure 9:
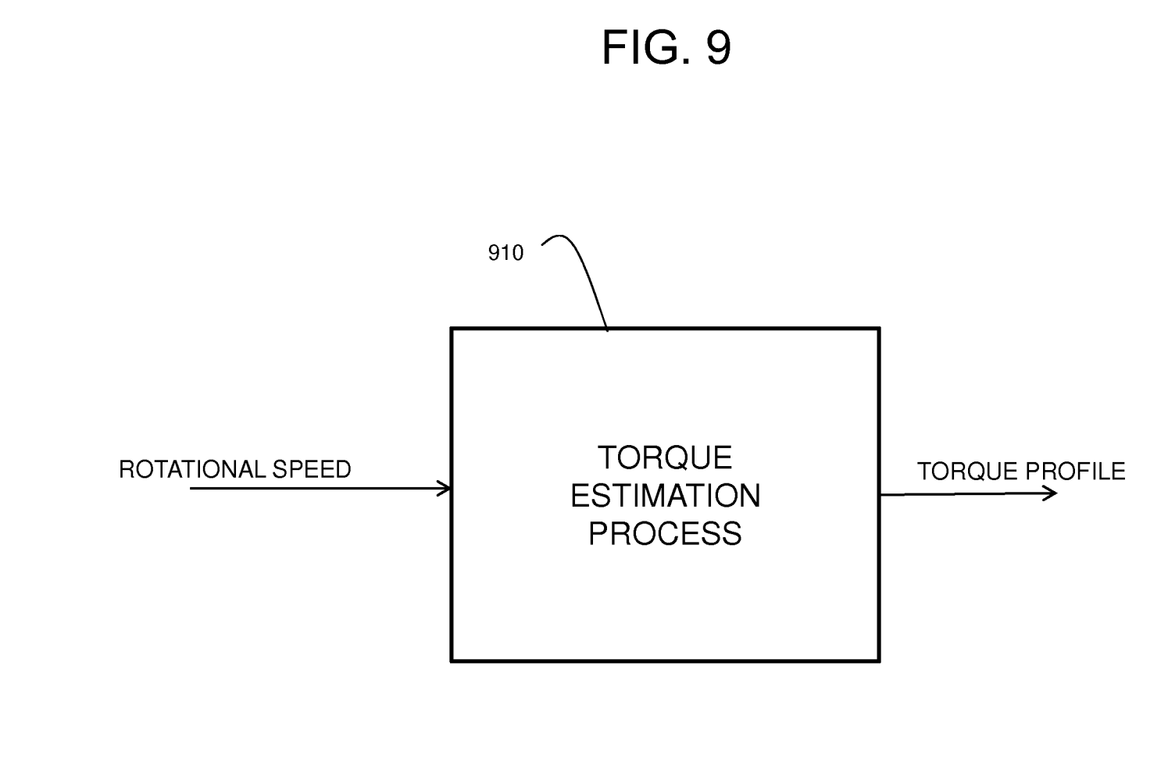
FIG. 9 is an illustration of an example embodiment of how to generate a torque profile from measured rotational speed of a reciprocating engine.

FIG. 9 is an illustration of an example embodiment of how to generate a torque profile from measured rotational speed of a reciprocating engine. The controller 150 implements a torque estimation process 910 which samples measured rotational speed of the engine (e.g., from the speed sensor 160) over time, derives acceleration components (considering the derivative of speed with respect to time) from the measured rotational speed at determined characteristic frequencies, and combines the acceleration components to determine a torque profile. The engine is then diagnosed by analyzing characteristics of the torque profile. For example, harmonic components of the torque profile can be generated and compared to thresholds, for example. Again, in accordance with an embodiment, the reciprocating engine can first be driven to a specified operating condition, state, or mode before performing the torque estimation process 910. In accordance with another embodiment, the torque estimation process is not performed until the engine reaches a determined operating condition, state, or mode during normal operation, where the controller is triggered to perform the torque estimation process and subsequent analysis of the estimated torque profile.

In accordance with various embodiments, the controller 150 is operable to report a degraded engine condition, for example, via the communication system 190. Furthermore, in accordance with various embodiments, the controller includes instructions configured to adjust an engine operating parameter based on the diagnosed condition.

Further examples of applications of systems and methods described herein are now provided. The examples illustrate various approaches for diagnosing and distinguishing between different types of engine degradation based on the frequency content of generator data (e.g., a relatively raw generator parameter such as dc-link voltage, or other derived generator parameters such as electromagnetic torque) associated with the generator, or speed of the engine during engine operation.

In one embodiment, a degraded cylinder of a four stroke engine may be detected based on a frequency content signature, such as the magnitude of the half-order frequency component being greater than a half-order threshold value. In an alternate embodiment, the magnitudes of the frequency content may be integrated over the range of frequencies, and a degraded cylinder of a four stroke engine may be detected based on the integration being greater than an integral threshold value.

Detection of one degraded cylinder, where the other cylinders of the engine are more healthy (or less degraded), may have a more clear frequency content signature than when multiple cylinders of the engine are degraded. For example, the frequency content signature of one degraded cylinder may be identified by comparing the magnitude of the half-order frequency component to a half-order magnitude threshold value. However, multiple degraded cylinders may have a different frequency component signature than a single degraded cylinder. Further, the position in the firing order of multiple degraded cylinders may change the frequency content signature. For example, two degraded cylinders 180° out of phase may have a different frequency component signature than two degraded cylinders in successive firing order, and thus the methods disclosed herein may identify one or more degraded cylinders based on various changes in the frequency content signature. Further, it may be beneficial to generate a frequency content signature of a healthy engine by recording frequency content at various frequencies and operating conditions. In one embodiment, the frequency content of the engine may be compared to the frequency content signature of a healthy engine. Anomalies not matching the frequency content signature of the healthy engine or a different degraded engine component may be identified and reported by the controller, for example. Other examples of degraded engine components include a degraded crankcase evacuation system, a degraded turbocharger, and a degraded crankcase.

In one embodiment, the time-domain generator data may be filtered by a low-pass filter with a cut-off frequency slightly greater than the first-order frequency. For example, the cut-off frequency may be ten to twenty percent greater than the first-order frequency. Thus, in one embodiment, the cut-off frequency may be determined by the engine speed. The generator data may be sampled in time at a frequency greater than or equal to the Nyquist rate. In one embodiment, the time-domain signal may be sampled at a frequency greater than twice the first engine order frequency. In one embodiment, the time-domain signal may be sampled at a frequency greater than twice the engine red-line frequency. Thus, by low-pass filtering and sampling at a frequency greater than or equal to the Nyquist rate, the frequency content of the generator data may not be aliased. The same may applied for speed data of the engine.

As discussed herein, the sampled generator data (e.g., dc-link voltage, torque, etc.) and/or the sampled engine speed data may be transformed to generate a frequency domain frequency content. In one embodiment, a fast Fourier transform may be used to generate the frequency domain frequency content. In one embodiment, a correlation algorithm may be applied to compare the frequency content of the data, to a signature for a condition of the engine. For example, the signature for a healthy engine may include frequency content at the first-order frequency with a magnitude below a first-order threshold value and frequency content at the half-order frequency with a magnitude below a half-order threshold value. The first-order threshold value may correspond to engine speed, engine load, crankcase temperature, and historical engine data.

For example, the historical engine and generator data may be stored in a database including samples of frequency content from earlier operation of the engine. Thus, a trend in frequency content may be detected and the trend may be used to determine the health of the engine. For example, an increasing magnitude at the half engine order component for a given engine speed and load may indicate that a cylinder is degrading. As another example, an increasing average crankcase pressure coupled without an increasing magnitude at the half engine order component for a given engine speed and load may indicate that the turbocharger or crankcase evacuation system is degrading. A potential fault may include a degraded cylinder, a degraded turbocharger, or a degraded crankcase evacuation system.

In one embodiment, frequency content of the generator data and/or the engine speed data may be stored in a database including historical engine and generator data. For example, the database may be stored in memory 154 of controller 150. As another example, the database may be stored at a site remote from rail vehicle 106. For example, historical data may be encapsulated in a message and transmitted with communications system 190. In this manner, a command center may monitor the health of the engine in real-time. For example, the command center may perform steps to diagnose the condition of the engine using the generator/speed data transmitted with communications system 190. For example, the command center may receive data from rail vehicle 106, frequency transform the data, apply a correlation algorithm to the transformed data, and diagnose potential degradation of the engine. Further, the command center may schedule maintenance and deploy healthy locomotives and maintenance crews in a manner to optimize capital investment. Historical data may be further used to evaluate the health of the engine before and after engine service, engine modifications, and engine component change-outs.

In one embodiment, a potential fault may be reported to the locomotive operating crew via display 180. Once notified, the operator may adjust operation of rail vehicle 106 to reduce the potential of further degradation of the engine. In one embodiment, a message indicating a potential fault may be transmitted with communications system 190 to a command center. Further, the severity of the potential fault may be reported. For example, diagnosing a fault based on frequency content of generator data and/or engine speed data may allow a fault to be detected earlier than when the fault is diagnosed with only average engine information. Thus, the engine may continue to operate when a potential fault is diagnosed in the early stages of degradation. In contrast, it may be desirable to stop the engine or schedule prompt maintenance if a potential fault is diagnosed as severe. In one embodiment, the severity of a potential fault may be determined according to a difference between a threshold value and the magnitude of one or more components of the frequency content of the generator and/or speed data.

By analyzing the frequency content of generator and/or speed data, it may be possible to monitor and diagnose the engine during operation. Further, operation of an engine with a degraded component may be adjusted to potentially reduce additional degradation of the engine component and to potentially reduce the likelihood of additional engine failure and in-use failure. For example, the half-order component may be compared to a half-order threshold value. In one embodiment, if the magnitude of the half-order component is greater than the half-order threshold value, the potential fault may be a degraded cylinder. However, if the magnitude of the half-order component is not greater than the half-order threshold value, the potential fault may be a degraded turbocharger or a degraded crankcase evacuation system.

In one embodiment, the potential fault may be reported to the locomotive operating crew via display 180 and the operator may adjust operation of rail vehicle 106 to reduce the potential of further degradation. In one embodiment, a message diagnosing the potential fault may be transmitted with communications system 190 to a command center.

In one embodiment, an engine operating parameter may be adjusted to identify a degraded cylinder. For example, the degraded cylinder may be identified based on selective disabling of fuel injection to one or more cylinders of the engine.

In one embodiment, fuel injection may be disabled for each cylinder of the plurality of cylinders in a sequence while one or more of the generator and/or speed data and associated frequency content are monitored. For example, fuel injection to one cylinder may be disabled while the other cylinders operate normally. By disabling each cylinder in a sequence, the degraded cylinder may be identified. As another example, fuel injection to a group of cylinders may be disabled while the other cylinders operate normally. By cycling through different groups in a sequence, the degraded cylinder may be identified through a process of elimination.

In one example, the half-order frequency component of the generator and/or speed data may be monitored for each disabled cylinder of a four stroke engine. The disabled cylinder may be a degraded cylinder when the half-order frequency component drops below a half-order threshold value while the cylinder is disabled. The disabled cylinder may be a healthy cylinder when the half-order frequency component remains above the half-order threshold value while the cylinder is disabled. In other words, the degraded cylinder may be the cylinder that contributes a higher amount of frequency content at the half-order frequency component than other cylinders. In one embodiment, the selective disabling diagnosis may be performed when the engine is operating at idle or lightly loaded.

In one embodiment, the selective disabling diagnosis may be further based on frequency content of engine operating parameters, such as engine speed. For example, the engine speed may include frequency content at the half-order frequency component when a degraded cylinder is operating. Thus, observing frequency content of various engine operating parameters while selectively disabling each cylinder may identify the degraded cylinder.

In one embodiment, the degraded cylinder may be identified based on selectively varying fuel injection to one or more cylinders of the engine. For example, fuel may be selectively increased or decreased to each cylinder while the half-order frequency component of the generator and/or speed data is monitored. Further, the signature, e.g. the frequency content, of each cylinder may be compared to historical data for the engine or to a healthy engine. For example, the diagnosis test may be performed on a healthy engine to generate a baseline signature. The baseline signature may then be compared to the frequency content while the engine is being diagnosed. In one embodiment, the degraded cylinder may be identified by varying engine fuel injection timing. For example, advance angle adjustments may be used to diagnose the degraded cylinder. For example, engine fuel injection timing may be retarded to potentially increase frequency content of the half-order frequency component.

It may be more desirable to switch off the engine than to have a degraded cylinder fail in a manner that may cause additional damage to the engine. In one embodiment, a threshold value may be determined that indicates continued operation of the engine may be undesirable because the potential fault is severe. For example, the potential fault may be judged as severe if a magnitude of the half-order frequency component exceeds a threshold value. The engine may be stopped if the severity of the potential fault exceeds the threshold value.

A request to schedule service may be sent, such as by a message sent via communications system 190, for example. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the engine, such as by adjusting an engine operating parameter based on the diagnosed condition. It may be determined if derating of the engine is enabled. For example, derating the power of the engine may reduce the magnitude of one or more components of the frequency content of the generator and/or speed data.

An engine operating parameter may be adjusted, such as to reduce additional degradation of the degraded component, for example. In one embodiment, engine speed or power may be governed. In one embodiment, fuel injection may be reduced or disabled to the potentially degraded cylinder while continuing to operate the other cylinders. Thus, the engine may continue to operate and further degradation of the degraded cylinder may be reduced. In this manner, the engine may be adjusted to potentially reduce additional degradation of the engine component and to potentially reduce the likelihood of catastrophic engine failure and road failure.

In one embodiment, a test kit may be used for identifying frequency content of the generator and/or speed data and diagnosing a condition of the engine based on the frequency content of the data. For example, a test kit may include a controller that is operable to communicate with one or more generator and or engine speed sensors and operable to sample the associated data. The controller may be further operable to transform signals from the one or more sensors into a frequency content that represents frequency information of the engine. The controller may be further operable to diagnose a condition of the engine based on the frequency content of the sampled data from the sensor(s). The test kit may further include one or more sensors for sensing generator parameters (e.g., generator output voltage) and/or engine parameters (e.g., engine speed).

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be". The terms "generator" and "alternator" are used interchangeably herein (however, it is recognized that one term or the other may be more appropriate depending on the application). The terms "frequency content" and "harmonic content" are used interchangeably herein and can refer to fundamental frequency (and/or phase) components and associated harmonic frequency (and/or phase) components above and below the fundamental components. The term "instructions" as used herein with respect to a controller or processor may refer to computer executable instructions. As used herein, the terms "speed", "speed data" and "speed signal" can refer to any of a rotational speed of an engine, harmonic content of a measured engine speed, a difference in a measured speed of an engine from cycle to cycle, a difference in times for an engine to rotate over a determined angle, and a plurality of time intervals, where each time interval corresponds to an amount of time it takes for an engine to rotate over a specified angle.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A method for a reciprocating engine, comprising:
diagnosing a condition of the engine based on harmonic content of a measured rotational speed of the reciprocating engine using at least a processor.

2. The method of claim 1, wherein at least one of a magnitude and a phase of a half-order frequency component of the harmonic content is analyzed to diagnose the condition.

3. The method of claim 1, wherein the reciprocating engine is first driven to a specified operating condition, state, or mode.

4. The method of claim 1, wherein the rotational speed is measured when the reciprocating engine reaches a determined operating condition, state, or mode.

5. A method for a reciprocating engine, comprising:
diagnosing a condition of the engine based on a difference in a measured rotational speed of the reciprocating engine from cycle to cycle using at least a processor.

6. The method of claim 5, wherein the reciprocating engine is first driven to a specified operating condition, state, or mode.

7. The method of claim 5, wherein the difference in a measured rotational speed is measured then the reciprocating engine reaches a determined operating condition, state, or mode.

8. A method for a reciprocating engine, comprising:
diagnosing a condition of the engine based on a difference in a time for the reciprocating engine to rotate over a determined angle from cycle to cycle using at least a processor.

9. The method of claim 8, wherein the reciprocating engine is first driven to a specified operating condition, state, or mode.

10. The method of claim 8, wherein the difference in a time is measured when the reciprocating engine reaches a determined operating condition, state, or mode.

11. A method for a reciprocating engine operationally connected to a generator, comprising:
measuring a rotational speed of the reciprocating engine over time using a speed sensor;
measuring electrical parameters associated with the generator over time using at least a processor;
correlating characteristics of the measured rotational speed to characteristics of the measured electrical parameters using at least the processor; and
diagnosing a condition of the engine based on the correlated characteristics using at least the processor.

12. The method of claim 11, wherein characteristics of the measured rotational speed include at least one of harmonic content of the rotational speed, a difference in the measured rotational speed from cycle to cycle, and differences in a measured times for the reciprocating engine to rotate over a determined angle.

13. The method of claim 11, wherein the measured electrical parameters include at least one of an output current of the generator, an output voltage of the generator, a generator field current, a generator field voltage, a dc-link current, and a dc-link voltage.

14. The method of claim 11, wherein the reciprocating engine is first driven to a specified operating condition, state, or mode.

15. The method of claim 11, wherein the measuring and the correlating are performed when the reciprocating engine reaches a determined operating condition, state, or mode.

16. A method for a reciprocating engine, comprising:
measuring a rotational speed of the reciprocating engine over time using a speed sensor;
determining a torque profile by combining acceleration components derived from the measured rotational speed at determined characteristic frequencies using at least a processor; and
diagnosing a condition of the engine based on characteristics of the torque profile using at least the processor.

17. The method of claim 16, wherein the reciprocating engine is first driven to a specified operating condition, state, or mode.

18. The method of claim 16, wherein the measuring and determining are performed when the reciprocating engine reaches a determined operating condition, state, or mode.

19. A vehicle system, comprising:
an engine;
a sensor for measuring a rotational speed of the reciprocating engine over time; and
a controller including instructions configured to sample the measured speed and diagnose a condition of the engine based on at least one of:
harmonic content of the measured speed;
a difference in the measured speed from cycle to cycle; and
differences in times for the engine to rotate over a determined angle.

20. The vehicle system of claim 19, wherein the controller is operable to report a degraded engine condition.

21. The vehicle system of claim 19, wherein the controller further includes instructions configured to adjust an engine operating parameter based on the diagnosed condition.

22. A vehicle system, comprising:
an engine;
a generator operatively connected to the engine;
a sensor for measuring a rotational speed of the reciprocating engine over time;
sensors for measuring electrical parameters associated with the generator during operation; and
a controller including instructions configured to sample the measured speed and the measured electrical parameters and diagnose a condition of the engine based on correlations between characteristics of the measured speed and characteristics of electrical parameters of the generator.

23. The vehicle system of claim 22, wherein the controller is operable to report a degraded engine condition.

24. The vehicle system of claim 22, wherein the controller further includes instructions configured to adjust an engine operating parameter based on the diagnosed condition.

25. A method for a reciprocating engine, comprising:
   measuring by the processor a plurality of time intervals, wherein each time interval corresponds to an amount of time it takes for an engine to rotate over a specified angle;
   determining by the processor a frequency content of the plurality of time intervals;
   calculating by the processor a combined value of the amplitudes of the frequency content around a specified harmonic frequency; and
   diagnosing a condition of the engine based on the combined value.

26. The method of claim 25, wherein the specified harmonic frequency is a half-order frequency.

27. The method of claim 25, wherein the combined value is a root-mean-square (RMS) value.

* * * * *